June 21, 1949.  F. J. AVES  2,473,698
REARVIEW MIRROR ADJUSTABLE BY
ROTATION ABOUT A MEDIAN AXIS
Filed Sept. 22, 1947
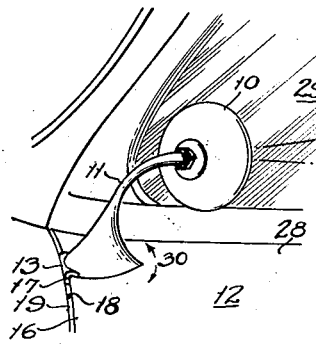
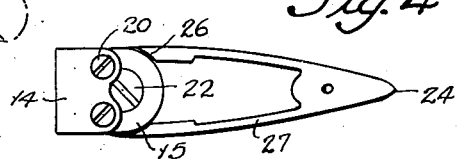
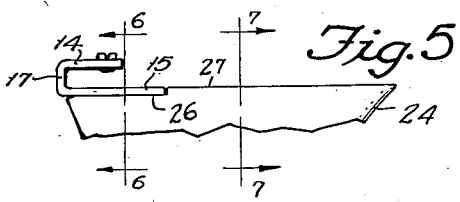
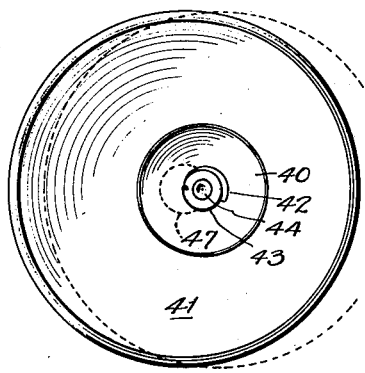
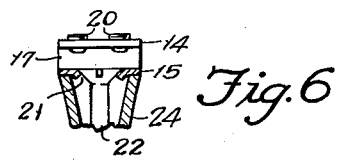
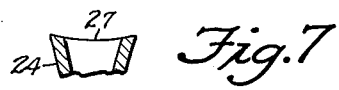
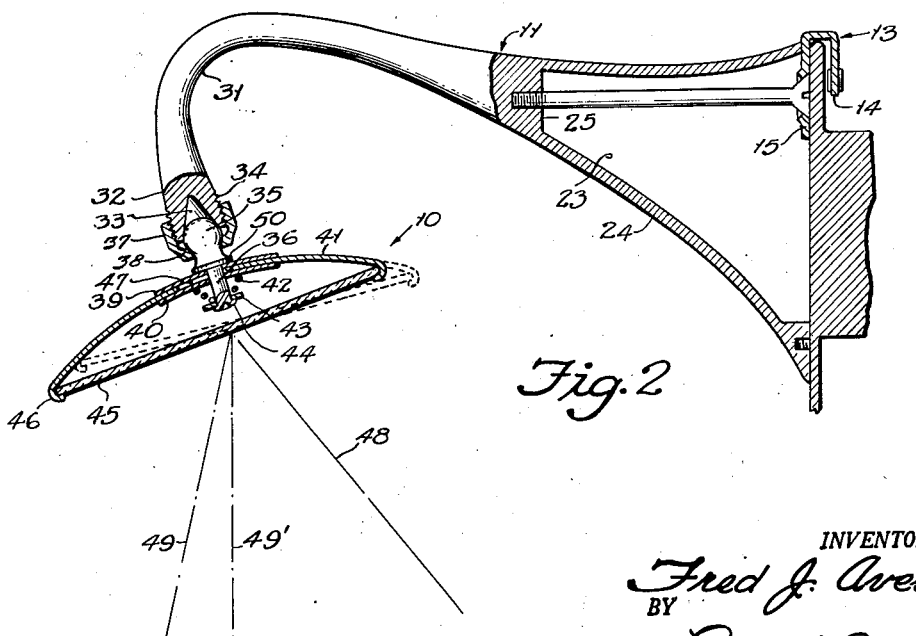
INVENTOR.
Fred J. Aves
BY
Lynn Latta
—ATTORNEY—

Patented June 21, 1949

2,473,698

UNITED STATES PATENT OFFICE 2,473,698

REARVIEW MIRROR ADJUSTABLE BY ROTATION ABOUT A MEDIAN AXIS

Fred J. Aves, Beverly Hills, Calif.

Application September 22, 1947, Serial No. 775,462

3 Claims. (Cl. 88—93)

1

This application is in part a continuation of my application, Serial No. 594,004, filed May 16, 1945, now Patent No. 2,456,362, for Remote control adjustable mirror. The present invention relates to a rear view mirror of the type disclosed in said application, except that it is adjustable, not by remote control but by direct manual engagement of the mirror itself.

An object of the invention is to provide a simple and inexpensive yet practical and efficiently operative rear view mirror for a motor vehicle.

Another object is to provide such a mirror which is particularly adapted for being mounted externally of the body of the motor vehicle.

Another object is to provide such a mirror having novel and improved means whereby adjustment of the angle of reflection thereof is effected by rotating the mirror about a substantially median axis.

A further object is to provide a novel and improved swivel mounting through which a rear view mirror may be adjusted to different angles of reflection.

A further object is to provide a mounting for a rear view mirror, having improved means for attachment thereof to a portion of a vehicle body without requiring the performance of any drilling or other machine work upon such body portion.

Other objects and advantages will appear in the following specification, taken in connection with the accompanying drawings, wherein:

Fig. 1 is a perspective view of a rear view mirror embodying my invention, attached to a front door of a motor vehicle;

Fig. 2 is a plan view of the same with portions of the door and the mirror and the mounting shown in section;

Fig. 3 is a front view of the mirror frame, with the mirror removed therefrom;

Fig. 4 is an end view of the mounting bracket;

Fig. 5 is a side view of the heel portion of the mounting bracket;

Fig. 6 is a detail sectional view taken on the line 6—6 of Fig. 5;

Fig. 7 is a detail sectional view taken on the line 7—7 of Fig. 5.

As an example of one form in which the invention may be embodied, I have shown in the drawing a rear view mirror assembly comprising a mirror unit 10 and a mounting bracket 11, attached to a forward portion of a front door 12 of a motor vehicle.

The invention provides for attaching the bracket 11 to the door 12 without requiring the

2 drilling of holes or any other machine work upon the door. This is accomplished by providing a clamp 13 embodying a yoke having parallel arms 14 and 15 spaced apart just sufficiently to freely receive the forward flange 16 of the door 12 and having a web portion 17 adapted to pass through the crack 18 normally present between the forward door flange and the adjacent shoulder 19 of the motor vehicle body.

The clamp 13 is provided with set screws 20 threaded through the arm 14 thereof and adapted to engage the inner side of the flange 16. The arm 15 of the clamp is provided with a dimpled opening 21 to receive the head of a long screw 22. The screw 22 extends through a cavity 23 in the heel 24 of the mounting bracket 11 and is threaded into a solid portion 25 of the bracket 11 at the inner extremity of the cavity 23. The arm 15 of the clamp 13 is received in a recess 26 in the end of the base portion 24 of the bracket 11 so as to be flush with the end edge 27 of the base portion 24. The end edge 27 is shaped arcuately as shown in Fig. 7, to fit the convex curvature of the hip 28 (just below the window 29) of the door 12. The screw 22 provides a pivot around which the bracket 11 may be adjusted as indicated by the arrows 30 in Fig. 1, with the surface 27 remaining in contact with the hip surface 28.

The bracket 11 has a goose neck portion 31 terminating in a shank 32 the axis of which is inclined at a small angle (which may be approximately within the range of from five to twenty degrees) with reference to the longitudinal axis of the end surface 27 of the base 24. In the end of the shank 32, coaxial therewith, is a recess 33 which is circular in transverse section and is preferably of approximately conical shape. The end portion of the shank 32 is externally threaded as at 34. Seated in the recess 32 is a ball shaped trunnion 35 which carries a mirror mounting post 36. An internally threaded collar 37 is threaded upon the thread portion 34 of the shank and has an inwardly extending flange 38 which bears against the spherical surface of the trunnion 35. The flange 38 and recess 33 provide opposed annular jaws engaging the trunnion 35 on spaced circular lines of contact and adapted, when the collar 37 is advanced on the threaded portion 34, to securely clamp the trunnion 35 between them, thereby to fix the post 36 in any selected position of adjustment deviating angularly from the axis of the shank 32. As shown in Fig. 2, the post 36 is positioned on said axis, but it will be understood that by loosening the collar 37 it may be adjusted to any position of inclination within pre-determined angular limits.

Mounted upon the post 36 are a pair of spaced washers or discs 39 and 40 each having a surface conforming to a portion of a spherical surface. Between these spherical surfaces of the washers 39 and 40, there is frictionally engaged a mirror frame or casing having a back 41 which conforms to the engaging surfaces of the washers 39 and 40. The washers 39 and 40 are maintained in frictional engagement with the back 41 under the yielding pressure of a conical spring 42 which is disposed under compression between the washer 40 and a washer 43 that is engaged against a head 44 on the post 36. The small end of the spring 42 pilots on the post 36 so as to position the spring.

A mirror 45 is mounted in an annular channel 46 which constitutes the periphery of the back 41.

The post 36 extends through an opening 47 in the back 41 which is considerably larger in diameter than the post. The clearance between the post 36 and the opening 47 provides for adjustment of the mirror to any position intermediate two limit positions (in one of which the mirror is centered with reference to the post 36, i. e., coaxial therewith, and the plane of the mirror is at right angles to the axis of the post 36, and in the other of which the mirror casing is disposed eccentrically with reference to the post 36 and the plane of the mirror subtends an angle deviating from a right angle with reference to the axis of the post).

It will now be apparent that the invention provides the following features:

(a) The bracket 11 may be connected to a motor vehicle by clamping it to the forward flange of a front door of the vehicle in such a manner as to eliminate the necessity for drilling any holes or doing any other machine work on the vehicle body.

(b) The bracket 11, when thus connected to the door, is mounted for pivotal adjustment of its base portion 34 around the general longitudinal axis of the bracket, whereby to facilitate obtaining maximum closeness of fit between the arcuate end surface 27 and the exterior surface of the door hip 28. Such adjustment also provides an angular adjustment of the axis of the shank 32 in a vertical direction, whereby to raise or lower the end of the shank 32 within limits.

(c) The mirror frame, when adjusted to an eccentric position with reference to the post 36, may be manually rotated about the post 36, thereby shifting the mirror 45 through a series of positions in which it successively assumes different angles with reference both to the vertical and the horizontal. In thus moving through a complete circumference, the mirror 45 will describe a conical path of revolution, and the line of sight from the operator's eye to the mirror indicated by the line 48 in Fig. 2 will represent the reflection of any one of a series of light beams approaching the mirror along any one of a series of paths collectively defining a conical surface diverging rearwardly from the mirror within limits indicated by the lines 49 and 49′, said conical surface encompassing the field of vision reflected by the mirror. To illustrate, if the vision were fixed upon the mirror along the line of sight 48 while the mirror was being rotated throughout a complete revolution, the line of sight from the mirror to the object being sighted would describe a conical path of revolution of which the lines 49 and 49′ indicate the limits in a horizontal plane. Such conical path of revolution is indicated in Fig. 1 at 49″. Within this conical path of revolution, the line of sight from the mirror will be adjusted vertically, horizontally, and in intermediate directions.

(d) The magnitude of the angle subtended by the path of revolution 49, 49′ may be varied from zero to a maximum by changing the eccentricity of the mirror casing 41 between the limits previously specified. When the mirror, by such adjustment, is brought to its centered position, at right angles to the axis of the post 36, a single fixed path of reflection will be provided. With a slight eccentricity of the casing 41, the paths of reflection 49, 49′ will diverge slightly. With adjustment of the casing 41 to maximum eccentricity, maximum divergence of the paths of reflection 49, 49′ will be provided for. This position of maximum eccentricity is determined by contact of the edge of the opening 47 against the post 36 as indicated in Fig. 2.

In adjusting the eccentricity of the casing 41, the casing must be shifted between the washers 39 and 40 by the application of sufficient force to overcome the frictional grip of the washers against the casing as determined by the pressure of the spring 42. This frictional grip of the washers upon the casing serves to maintain the position of eccentricity while permitting rotation of the casing about the post 36, no movement between the engaging surfaces of the washers 39, 40 and casing 41 being required by such rotation. Fixation of the mirror in any position to which it is adjusted by such rotation about the post 36 is provided for by frictional engagement between the outer surface of the washer 39 and the shoulder or abutment 50 of the trunnion 35, against which said outer washer surface is pressed by the pressure of the spring 42.

I claim:

1. In a rear view mirror device, a casing carrying a mirror in its front and having a semispherical rear wall of large radius relative to its area presenting an axial opening, a pair of relatively small, semispherical discs disposed, respectively, against and conforming to the inner and outer surfaces of said rear wall in covering relationship to said opening, said discs having coaxial openings smaller than the opening in said rear wall, a mounting post of round cross section having a diameter substantially equal the diameter of the opening in each of the respective discs, said post extending through said openings in said discs and said rear wall, means providing an annular abutment, of smaller diameter than the outer disc, around the post and in position to be frictionally engaged by the outer disc, spring means in the casing around the inner end of the post and bearing rearwardly against the inner disc whereby to resiliently urge the discs and casing towards said abutment, and bracket means supporting the post; said casing being laterally slidable relative to the discs and post.

2. In a rear view mirror device, a casing carrying a mirror in its front and having a semispherical rear wall of large radius relative to its area presenting an axial opening; a pair of relatively small, semispherical discs disposed, respectively, against and conforming to the inner and outer surfaces of said rear wall in covering relationship to said opening, said discs having coaxal openings smaller than the openings in said rear wall, a mounting post of round cross section having a diameter substantially equal the diameter of the opening in each of the respective discs, said post extending through said openings in said discs and said rear wall, means providing an annular abutment, of smaller diameter than the outer disc, fixed on the post in position for engagement by the outer disc, spring means in the casing bearing rearwardly against the inner one of the discs and resiliently urging the discs and casing towards said abutment, and bracket means non-rotatably supporting the post; said discs and casing being rotatable about the post and said casing being laterally slidable relative to the discs and post.

3. In a rear view mirror device, a casing carrying a mirror in its front and having a semispherical rear wall of large radius relative to its area presenting an axial opening, a pair of relatively small, semispherical discs disposed, respectively, against and conforming to the inner and outer surfaces of said rear wall in covering relationship to said opening, said discs having coaxial openings smaller than the opening in said rear wall, a mounting post of round cross section having a diameter substantially equal the diameter of the opening in each of the respective discs, said post extending through said openings in said discs and said rear wall, means providing an annular abutment, of smaller diameter than the outer disc, fixed on the post in position for engagement by the outer disc, spring means in the casing bearing rearwardly against the inner one of the discs and resiliently urging the discs and casing towards said abutment, and bracket means nonrotatably and universally adjustably supporting the post; said discs and casing being rotatable about the post and said casing being laterally slidable relative to the discs and post.

FRED J. AVES.

REFERENCES CITED

The following references are of record in the file of this patent:

UNITED STATES PATENTS

| Number | Name | Date |
|---|---|---|
| 1,526,226 | La Hodny | Feb. 10, 1925 |
| 1,537,039 | Short | May 5, 1925 |
| 1,844,675 | Oshei et al. | Feb. 5, 1932 |
| 1,909,526 | Falge et al. | May 16, 1933 |
| 2,248,833 | Thibault et al. | July 8, 1941 |
| 2,356,432 | Roedding | Aug. 22, 1944 |
| 2,405,731 | Beggs et al. | Aug. 13, 1946 |